GLASS TANK STRUCTURE
Filed June 7, 1966
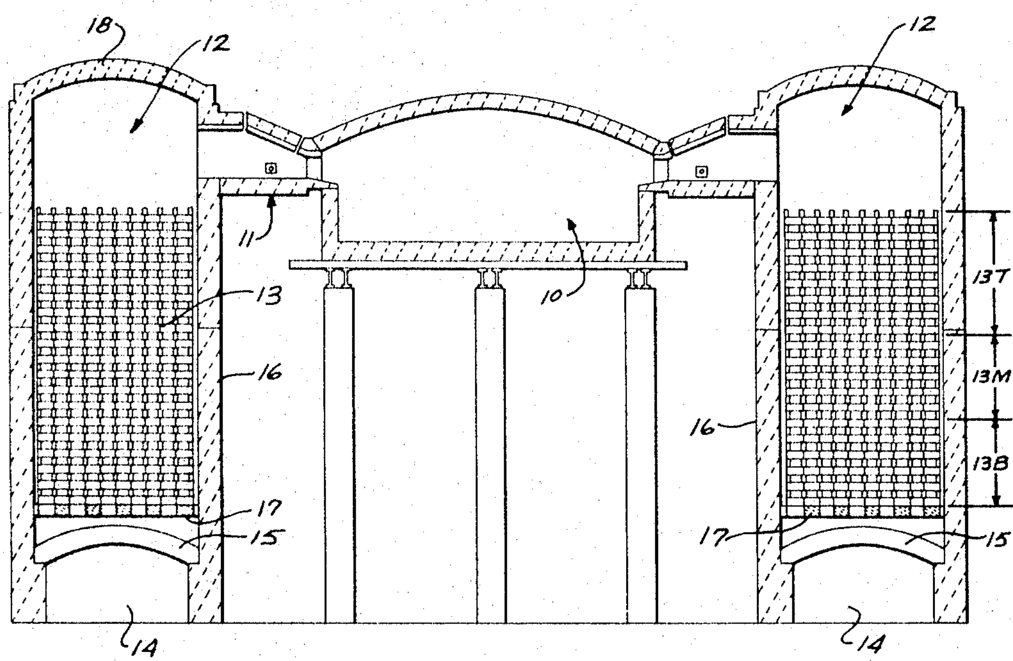
INVENTORS
GEORGE E. BRINKERHOFF
BY
William C. Nealon
ATTORNEY United States Patent Office 3,463,466

Patented Aug. 26, 1969

3,463,466

GLASS TANK STRUCTURE

George E. Brinkerhoff, Bethel Park, Pa., assignor to Dresser Industries, Inc., a corporation of Delaware Filed June 7, 1966, Ser. No. 555,880
Int. Cl. F27d *17/00;* F23l *15/02*
U.S. Cl. 263—15 4 Claims

ABSTRACT OF THE DISCLOSURE

A zoned refractory regenerator chamber for glass melting furnaces wherein each zone contains refractory compositions particularly resistant to the destructive mechanisms in that zone with specific emphasis being placed on utilizing an all basic refractory regenerator chamber.

The ever increasing progress in glassmaking practice has brought about greatly increased production of glass per square foot of melting area and per cubic foot of glass tank furnace volume. The severity of operating conditions which glass tank refractories are required to withstand continues to become greater as the push toward higher production continues. Much higher temperatures are employed, and the amount and corrosiveness of the batch carryover and volatile fluxes have increased.

The selection of optimal refractories for a glass tank would give the longest and most balanced life through all parts of the furnace. By balanced life, it is meant that all parts last about the same length of time. This requires special attention to the various positions where short service life might cause shutdown for repairs long before a complete rebuild of the glass tank is necessary.

For a long period of time the regenerators of glass tanks have been the limiting factor in glass tank service life. Within the regenerator, the topmost checkers have always received the most severe service from wide temperature variations and corrosion. The rider arches and tile receive severe service in their support function for the entire checker setting. One move to improve the service life of glass tank regenerators has been to replace super duty fireclay and high alumina in supporting arches and tile and checkers with basic brick. Basic brick are those which are made from batches containing dead burned magnesite, chrome ore, olivine, etc. These have better chemical resistnce to glass tank carryover. Transition to basic brick has not been altogether satisfactory, however, as the basic brick available have not had the necessary resistance to the combination of destructive effects present in checker settings, especially the upper settings, and the strength under corrosive conditions required of the rider arches and tile.

With all basic regenerator chambers, the total service life of the glass tank regenerator was extended, but uniform service life was difficult to obtain because the brick available did not offer a choice of brick properties sufficient to enable the tailoring of a uniformly resistant regenerator chamber. For example, all checker setting zones had extended life, but the top checker settings did not last as long as the middle and lower checker settings.

It is therefore an object of this invention to provide a regenerative-type glass tank structure which will enjoy the longer service life available by using basic brick in the regenerator chambers, but which will also have a more uniform service life.

It is another object of this invention to provide a glass tank regenerator structure comprising basic refractory brick which will have a longer and more uniform service life.

The objects and advantages of this invention are more easily understood by a reference to the drawing, the single figure of which is a schematic section view of a glass tank furnace. It should be pointed out that the drawing is only exemplary of the type of regenerator structure referred to in this specification and not intended to be limiting.

The raw materials of a glassmaking batch are melted in the tank 10 which is supplied with heat by the oxidation of fuel and preheated air. The fuel enters ports 11. To preheat the air, it is alternately drawn through the regenerators 12. The regenerators contain checker settings 13 which are a network of refractory brick. The checker settings are first heated by exhaust gas escaping through them. Thereafter, the checkers are cooled while transferring their heat to the combustion air being drawn through them. Air is supplied to the regenerators being cooled through canals 14. The opposite regenerator which is simultaneously being heated is exhausted through its corresponding canal 14. In other designs, both regenerators are located on the one end of the tank and are separated by a division wall. The checker settings are held above the canals by rider arches 15 which span the regenerator walls 15, and rider tile 17 which rest on the rider arches all of which rest on a floor. The regenerators are covered by a crown 18.

The checker settings are characterized by three wear zones; the top checkers 13T, the middle checkers 13M and the bottom checkers 13B. The dominant service factors in the top checkers are different than the middle and lower zones. But, generally, the same factors are present to some degree in all zones, as will be understood from the following discussion.

Briefly, according to one aspect of this invention, a glass tank regenerator is provided which has an all-basic regenerator chamber. The sidewalls, crown and floor are fabricated from fusion cast or burned chrome-magnesite refractory brick. The lower sections of the checker setting are comprised of chrome or chrome-magnesite brick. Middle settings are selected from stabilized forsterite, magnesite, or chrome-magnesite brick. The upper checker settings, which are the most critical are fabricated from either magnesite brick or fused grain magnesite chrome brick (as is defined hereinafter). The latter brick are found to be desirable in the upper checker settings where borosilicate glass is being processed because of the highly corrosive atmosphere. In furnaces having two regenerators side by side, it is preferred that the division wall separating them also be fabricated from said fused grain magnesite chrome brick. The rider arch and tile are fabricated from ceramically bonded refractory shapes containing a preponderance (at least 50%) of fused grain which analyses on an oxide basis, 15 to 25% $Cr_2O_3$, 45 to 75% MgO, 4 to 20% $Al_2O_3$, 3 to 15% FeO, 0.5 to 3% $SiO_2$ and up to 3% CaO. The molar ratio of CaO to $SiO_2$ in said grain is no greater than about 2:1. The refractory grain are characterized petrographically as comprising predominantly, relatively large, abutting grains of periclase, crystals of spinel contained within said periclase grains and isolated pockets of silicates contained within the periclase grains. The balance of the brick may consist of dead burned magnesite, chrome ore or mixtures thereof.

These latter refractory brick are prepared from what we refer to as fused magnesite-chrome grain. The components are melted, resolidified and then comminuted before pressing and burning. The melting and resolidification of the chrome ore-magnesia mixture must be performed in a manner which insures a formation in the refractory product of a structure as previously described. This is preferably and conveniently accomplished in an electric furnace.

In practice, a chrome ore-magnesia mix, i.e., 40% chrome ore, 60% MgO, is continuously fed into a conventional electric furnace which is heated by one or more carbon electrodes and the electrodes are gradually raised and withdrawn as a melt is formed in order to permit slow and gradual resolidification of a melted material. It is essential in the present invention that the melt be rather slowly solidified so as to permit the formation of a particular structure required in the refractory, viz. large abutting periclase grains, spinel crystals contained within the periclase grains, and silicate material distributed in isolated pockets surrounded by periclase. The slow resolidification promotes nucleation and growth of large periclase grains and results in the formation of an equilibrium structure which is stable throughout the usual operating temperatures encountered in service, i.e., up to 1750° C.

Although slow solidification of the melt is essential, once solidification has occurred, the solid hearth material should be cooled rather quickly to room temperature very soon after it is formed, preferably within about 2 hours in order that thermal stresses are set up in the solidified refractory material so that the crushability of the material is greatly enhanced. That is to say, the solidified refractory material is prestressed by the quick cooling which reduces the amount of energy required in subsequent crushing operations. This feature, in conjunction with the characteristically large size of the periclase grains facilitates crushing of the material and avoids the formation of excessive fines.

The cooling of the refractory material is conveniently accomplished by water cooling the shell of the furnace in which the solidified material is contained.

In any event, slow and gradual solidification of the melt and rapid cooling of the solidified material is essential whereas quick freezing and slow cooling of the solidified material is to be avoided. Otherwise, the required equilibrium structure in the refractory material is not achieved and the advantageous properties of the shapes are not obtained.

The mass of solid refractory material obtained by the foregoing procedure is broken out of the furnace after cooling and cleaned and crushed to the desired size by any suitable technique. The resulting particulate refractory material is characterized by high density, low porosity, and toughness, which properties are attributed to its composition, structure, and method of formation.

The preferred compositional ranges for the magnesite-chrome fused grain refractory material is 0.5 to 1.5% $SiO_2$, up to 1.0% CaO, 60 to 70% MgO, 5 to 10% FeO, 14 to 20% $Cr_2O_3$, and 4 to 10% $Al_2O_3$.

As is set forth above, the sidewalls and crown are fabricated from chrome ore-magnesite refractory brick; the lower section of the checker setting from chrome or chrome-magnesite brick and the middle settings from stabilized forsterite, magnesite, or chrome magnesite brick. For example, a suitable magnesite refractory is disclosed and claimed in United States Patent No. 3,141,790, to Davies et al. The refractory shapes of this patent consist of at least about 96% MgO, having no more than about 1% of $R_2O_3$ materials (i.e., $Fe_2O_3$, $Al_2O_3$ and $Cr_2O_3$), the remainder being CaO and $SiO_2$ in a weight ratio between 3:1 and about 4:1, and being petrographically characterized by extensive periclase to periclase crystal attachment, with the CaO and $SiO_2$ content largely present in spaced, disconnected pockets between the periclase crystals, and characterized largely as tricalcium silicate. Another suitable magnesite material is that disclosed and claimed in United States Patent No. 3,106,475 to Davies et al., without tar impregnation. These Davies et al. shapes are ceramically bonded magnesia shapes having at least about 96% MgO on the basis of an oxide analysis.

A suitable stabilized forsterite refractory is disclosed and claimed in United States Patent No. 2,516,249 to Osborn, which shapes are formed of about 5 to 25% of free alumina and 95 to 75% of refractory material composed of about 30 to 90% of Mg-Fe olivine and 70 to 10% of dead burned magnesite.

A suitable chrome refractory composition is disclosed in U.S. Patent No. 3,421,749 to Garber et al. The composition consists of at least 85% chrome ore, 1 to 10% preformed spinel grain and 3 to 10% dead burned magnesite.

Suitable chrome-magnesite refractory shapes are disclosed and claimed in United States Patent Nos. 3,180,743 and 3,180,744, to Davies and Walther, which are directed in part, to direct bonded chrome-magnesite brick. Other chrome-magnesite refractory brick are disclosed and claimed in U.S. Patent No. 3,316,107 to Havranek. An exemplary composition is one containing from 80 to 60 parts, by weight, of chrome ore (such as Philippine chrome ore and concentrates, transvaal chrome ore, Turkish chrome ore, etc.) and 20 to 40 parts, by weight, of dead burned magnesia.

All of the above patents are assigned to the assignees of the present invention.

The following examples illustrate more clearly the teachings of the present invention.

EXAMPLE I

A mixture was prepared containing 40% transvaal chrome ore and 60% of low calcined caustic sea water magnesia. The composition of the ore and magnesia are set forth in Table I below.

TABLE I

| | Chrome Ore | Caustic Magnesia |
|---|---|---|
| Percent: | | |
| $SiO_2$ | 1.6 | 1.5 |
| CaO | 0.5 | 1.0 |
| MgO | 10.8 | 97.1 |
| FeO | 25.1 | 0.3 |
| $Cr_2O_3$ | 46.0 | |
| $Al_2O_3$ | 14.2 | 0.1 |

The mixture was prepared in 5000 pound lots and was melted and re-solidified in a single phase, two-electrode furnace having a water-cooled shell which was lined interiorly with partially fused magnesia-chrome ore material. The mix was fed continuously over a period of time into the furnace in the usual manner of "making a hearth" and a pool of molten material was developed in the furnace. The electrodes were gradually withdrawn as the melting proceeded with the result that the molten material gradually and slowly solidified in the furnace to "form a hearth." When the melting and resolidification of the material was completed, the solidified material was quickly cooled in the furnace by means of the cooling water provided in the furnace shell. The cooling to about room temperature took less than about 2 hours, after which the hearth material was broken out, cleaned, and then particulated into 1 in. x D lumps.

The refractory material obtained contained by analysis:

| | |
|---|---|
| $SiO_2$ | 1.38 |
| CaO | 1.57 |
| MgO | 62.55 |
| FeO | 10.64 |
| $Cr_2O_3$ | 18.21 |
| $Al_2O_3$ | 5.78 |

This material was then passed through a two step gyratory crushing and part of the resulting material was processed through a vibrating mill to obtain a desired particle size distribution.

The sizing of the material obtained was as shown in Table II.

TABLE II

| Proportion, percent: | Particle size, mesh |
|---|---|
| 28 | −½+¼ |
| 15 | −4+8 |
| 16 | −8+20 |
| 15 | −20+60 |
| 6 | −60+150 |
| 5 | −150+325 |
| 15 | −325 |

Screening was not necessary to obtain the above distribution and the distribution can be readily reproduced due to the substantially uniform nature of the material of the present invention.

The sized material was subsequently mixed in a rotating mixer with 2.5 to 3% by weight of an aqueous 40% solution of Bindarene, a lignin sulfonate binder. A weighed amount of the mix was pressed to approximately 10,000 p.s.i. in a steel die to produce a brick 9" x 2½" x 4½". The pressed brick was dried in a tunnel drier at 110° C. After drying, the brick was fired at 1600° C. for 3 hours to develop a ceramic bond between the refractory particles. It was found that the brick had sufficient strength for handling and installation and could be used directly in glass tank regenerator chamber construction.

Magnesite-chrome fused grain shapes made in accordance with the present invention were subjected to the following tests.

Two series of tests were conducted. In the first series, certain 9" straights were placed on a flat surface in a reheat furnace and each saturated with nine 100 gram pellets of reagent grade sodium sulfate at 1750° F. for a 5 hour period. Certain other brick, not slagged, were also prepared for testing. All brick were cut into 9" x 4½" x 1½" splits before testing.

The first test series was divided into two phases of study. For the initial phase, one slagged and one control split were placed on a flat surface across an 8" span in a laboratory cyclic temperature furnace. These were center-loaded with a high alumina support bar, 1" square and 4½" long, above which several zircon brick were balanced to produce a simulated load of approximately 12 pounds per square inch. Each brick (slagged and control) was cycled for 250 cycles of 25 minute duration, the cycles being in the temperature range of 1700 to 2000° F. The brick were then cooled, weighed, measured, and physical appearances were recorded.

In phase two of this series, the above test was duplicated on the same test brick, that is, 900 more grams of slag per brick and 250 additional cycles in the 1700 to 2000° F. range, to observe the effect of additional slag and temperature cycling. After measurements were conducted similar to those of Phase I, hot modulus of rupture at 2000° F. was obtained on all test brick to observe the effect of testing on hot strength of the samples.

The second test series designed to investigate the effect of a lower temperature cycle phenomenon involved the use of new brick, not those tested before. One brick was slagged at 1750° F. with 900 grams of sodium sulfate, as before and was again measured for amount of sulfate pickup. After cutting into splits, both slagged and control brick were loaded in three point fashion as before and cycled for 250, 25 minute cycles between 1400 and 1700° F. The brick were weighed and measured after cooling. Hot modulus of rupture data at 1700° F. was obtained on each test sample from this second series. Furnace atmosphere for all tests was maintained normal or strongly oxidizing.

The results of these tests are shown in Table III below.

TABLE III.—TEST 1—PART 1

[Test condition: 900 grams sodium sulfate; on brick 250 25-minute cycles; 1,700 to 2,000° F.]

| Treatment | Control | Slagged |
|---|---|---|
| Original bulk density of brick, p.c.fg | 206 | 206. |
| Sodium sulfate absorbed in brick before cycling. | | 6.1%. |
| Permanent linear change of brick after 250 cycles. | +0.1% | +0.1%. |
| Physical appearance of brick after 200 cycles, degree of cracking. | None, slightly crazed on top slagged surface. | None, crazed surface apparent. |
| Degree of permanent deformation under load.* | None | None. |

TEST I.—PART II

[Test condition: additional 900 grams slag; additional 250 cycles between 1,700 and 2,000° F.]

| Treatment | Control | Slagged |
|---|---|---|
| Total permanent linear change of brick after 500 cycles. | +0.1% | +0.1%. |
| Physical appearance of brick after 500 cycles, degree of cracking. | Crazed at corners and ends of test surface. | None. |
| Degree of permanent deformation under load. | None | Do. |
| Hot modulus of rupture, p.s.i., at 2,000° F. | 1,200 | 1,340. |

TEST II

[Test condition: 900 grams sodium sulfate; 250 25-minute cycles between 1,400 and 1,700° F.]

| Treatment | Control | Slagged |
|---|---|---|
| Original bulk density of brick, p.c.f. | 203 | 205. |
| Sodium sulfate absorbed in brick before cycling. | | 7.0%. |
| Permanent linear change in brick after 250 cycles. | 0.0% | 0.0%. |
| Physical appearance of brick after test, degree of cracking. | None | Slight crazing on edges on bottom of test sample. |
| Degree of permanent deformation | Trace of deformation | None. |
| Hot modulus of rupture, p.s.i. at 1,700° F. | 1,600 | 1,490. |

*Measured by placing straight edge on top of test surface, lengthwise of brick, and observing distance between bottom of straight at top center of brick.

The above results show, in Test I, Part I, the fused grain brick to have good resistance to load and relatively low absorption of sodium sulfate slag (common slag of glass furnaces). Test I, Part II showed the brick to have the same resistance to deformation along with slight linear expansion. The results also show that slag absorption actually increased the modulus of rupture of these brick. The results in Text II show the slagged brick to have zero deformation and linear expansion for the conditions indicated. Modulus of rupture was also good.

EXAMPLE II

Fused grain samples were prepared for microscopic analysis. The chemical analysis of sample A was 1% $SiO_2$, 5.9% $Al_2O_3$, 20.4% $Cr_2O_3$, 60.7% MgO, 10.4% FeO and 0.7% CaO. The chemical composition of sample B was 14.5% $Cr_2O_3$, 71.45% MgO, 4.37% $Al_2O_3$, 7.11% FeO, 0.9% $SiO_2$ and 1.61% CaO.

Microscopically, sample A showed periclase grain appearing as a gray background. The grain contained numerous exsolved dendrites of mixed spinel and some euhedral crystals of spinel. Isolated pockets of silicates occurred throughout the grain. Cleavage lines or fractures, which are typical of periclase occurred in cleavage planes within the periclase grain. Sample B revealed portions of abutting periclase grains and the cleavage pits of the respective grains which appeared to intersect upon extension at an angle of about 26°. Further, the grain revealed the silicate material to occur in discontinuous isolated pockets separated by periclase and spinel crystals and are contained in the periclase grains.

The advantageous properties, high density, low porosity, low gas permeability, reheat stability, superior resistance to spalling, high strength at elevated temperatures, high resistance to glass tank slags, and high resistance to corrosion from furnace gases in brick made from these fused grain are directly attributable to the structure and composition of the grain.

The strength of the brick is enhanced since the silicates in the constituent refractory material occur in pockets which act to relieve the stresses to which the brick are subjected in furnace operation. Also, since the silicates do not occur in a continuous phase, there is substantially no weakening of the brick at higher temperatures when the silicates are fluidized. This is due to the fact that the structure of the constituent refractory material comprises essentially a crystal to crystal bond.

The presence of silicates in pockets instead of a continuous phase also enhances the reheat stability and resistance to molten iron oxide and slags.

Accordingly, the prescribed compositional ranges for the magnesia-chrome fused grain refractory material are critical.

The use of the fused grain magnesite-chrome refractory defined above, with increased resistance to the thermal cycling in combination with the other refractories set forth above enables the construction of a glass tank regenerator of basic brick which will have not only extended service life but more uniform service life.

Having thus described our invention with sufficient particularity to enable those skilled in the art to practice it, what is desired protected by Letters Patent is set out in the claims below:

I claim:

1. In a glass melting furnace, at least one regenerator chamber defined by an upper crown and interconnecting sidewalls, said chamber containing a rider arch which spans opposing sidewalls and supports a plurality of rider tile, said rider tile supporting a checker setting disposed thereabove, said checker setting being composed of an upper, middle, and lower zone, said sidewalls and crown, being fabricated from refractories selected from the group consisting of fusion cast chrome magnesite brick and burned chrome-magnesite brick, said rider arch and tile being fabricated from ceramically bonded refractory shapes containing at least 50% fused grain, analyzing on an oxide basis, 15 to 25% $Cr_2O_3$, 45 to 75% MgO, 4 to 20% $Al_2O_3$, 3 to 15% FeO, 0.5 to 3% $SiO_2$ and up to 3% CaO, the molar ratio of CaO to $SiO_2$ in said shapes being no greater than about 2:1, the shapes being characterized petrographically as comprising predominantly, relatively large, abutting grains of periclase, crystals of spinel contained within said periclase grains and isolated pockets of silicates contained within the periclase grains, said lower zone of the checker setting being fabricated from refractories selected from the group consisting of chrome and chrome-magnesite brick said middle zone being fabricated from refractories selected from the group consisting of stabilized forsterite, magnesite and chrome-magnesite brick, and said upper zone being fabricated from a refractory selected from the group consisting of dead burned magnesite brick and fused grain magnesite chrome brick as above defined.

2. A furnace according to claim 1 in which the fused grain analyses on an oxide basis, 0.5 to 1.5% $SiO_2$, up to 1% CaO, 60 to 70% MgO, 5 to 10% FeO, 14 to 20% $Cr_2O_3$ and 4 to 10% $Al_2O_3$.

3. A furnace according to claim 1 which contains adjacent regenerator chambers with a division wall separating them, said division wall being fabricated from fused grain magnesite chrome brick as defined.

4. A furnace according to claim 1 in which the balance of the fused grain shapes are composed of at least one material selected from the group consisting of dead burned magnesia, chrome ore and mixtures thereof.

References Cited

UNITED STATES PATENTS

| | | | |
|---|---|---|---|
| 3,030,228 | 4/1962 | Hernandez et al. | 106—58 X |
| 3,326,541 | 6/1967 | Davies et al. | 263—51 X |

JOHN J. CAMBY, Primary Examiner

U.S. Cl. X.R.

263—51